Sept. 15, 1931. B. H. LARSON 1,823,152
STEAM TABLE SERVING PAN COVER
Filed Jan. 26, 1929
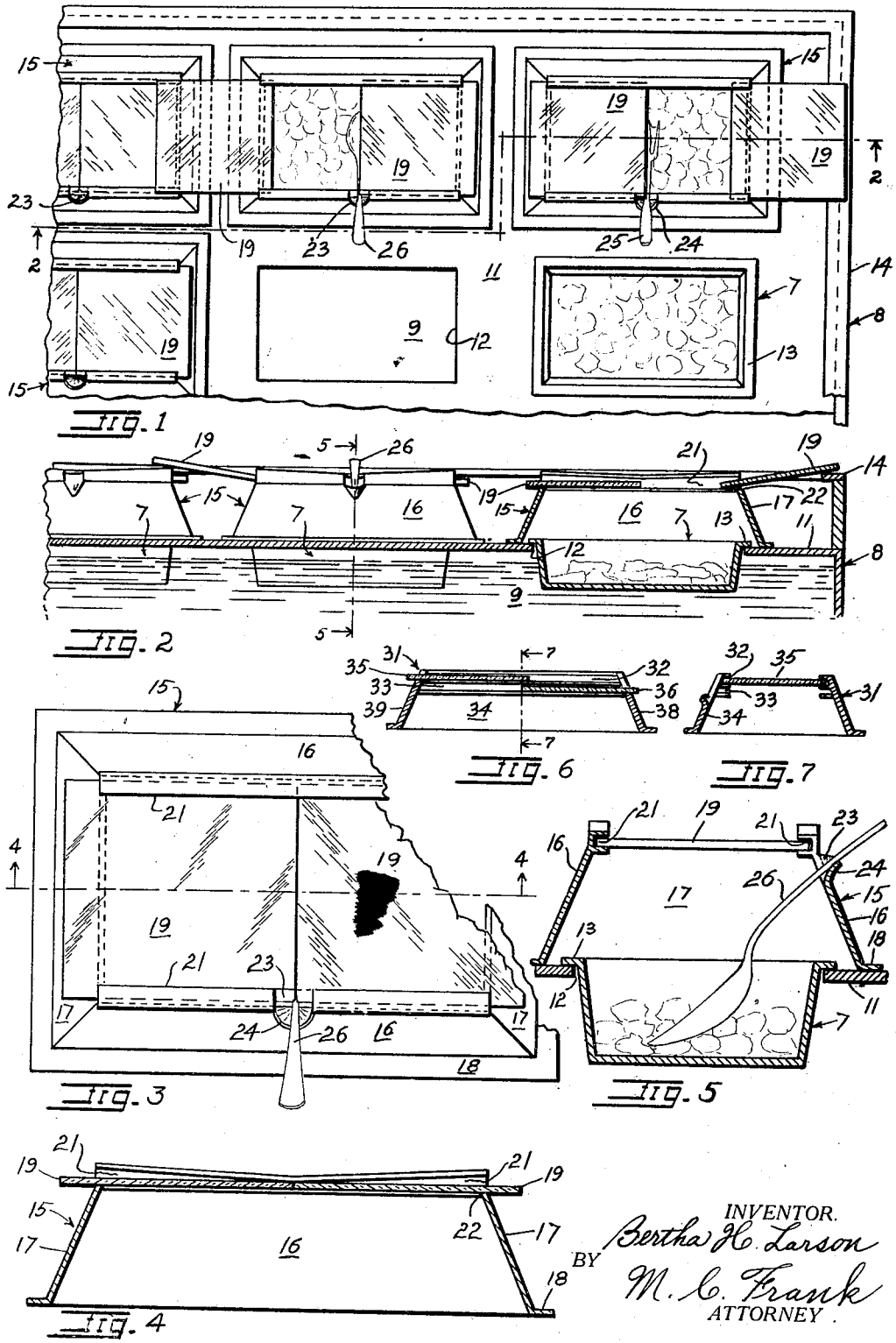
INVENTOR.
Bertha H. Larson
BY
M. C. Frank
ATTORNEY.

Patented Sept. 15, 1931

1,823,152

UNITED STATES PATENT OFFICE

BERTHA H. LARSON, OF SAN FRANCISCO, CALIFORNIA

STEAM-TABLE SERVING-PAN COVER

Application filed January 26, 1929. Serial No. 335,159.

The invention relates to an improved cover for food vessels from which food is arranged to be dispensed.

An object of the invention is to provide a generally opaque and improved cover of the class described having a transparent wall for viewing the contents of the food vessel covered thereby.

Another object of the invention is to provide a cover of the character described in which the transparent wall is displaceable for providing access to the contents of the covered vessel whereby the cover need not be removed from its operative position for effecting a removal of the vessel's contents.

A further object of the invention is to provide a cover of the class described which is arranged for the protrusion therethrough of a serving tool for food whereby the food engaging portion of the tool may remain in the food when the cover is closed, and said tool may be available for use when the cover is open.

Yet another object of the invention is to provide covers of the class described which are particularly designed for individual use with the serving pans of steam tables such as are used in restaurants.

The invention possesses other objects and features of advantage, some of which, with the foregoing, will be set forth in the following description of a preferred form of the invention which is illustrated in the accompanying drawings, in which:

Figure 1 is a fragmentary plan view of a steam table having covers embodying the invention operatively disposed thereon.

Figure 2 is a sectional elevation on the broken line 2—2 in Figure 1.

Figure 3 is an enlarged fragmentary plan view of a cover shown in Figure 1.

Figure 4 is a vertical section of the cover on the line 4—4 of Figure 3.

Figure 5 is a vertical section of a serving pan and its associated cover taken on the line 5—5 in Figure 2.

Figure 6 is a longitudinal and sectional elevation of another embodiment of the cover.

Figure 7 is a sectional view taken on the line 7—7 in Figure 6.

As herewith particularly disclosed, the covers of my invention are arranged for use with the serving pans 7 of a steam table 8. As is usual, the steam table comprises a receptacle 9 having a top 11 provided with a plurality of openings 12 through which the pans 7 are arranged to depend into the receptacle, and are supported on the receptacle top by reason of the engagement of outwardly extending rims 13 thereof with the upper surface of the top 11 around the openings. The lower pan portions are disposed in water which is kept hot in any suitable manner; no water heating means are shown, as such forms no part of the present invention. A usual rail 14 is mounted on the top 11 to extend along the edges thereof.

As shown in Figures 1 to 5 inclusive, covers 15 are provided for the different pans 7. These covers are seen to essentially comprise unitarily associated side and end walls 16 and 17 respectively, said walls terminating at their bottoms in a flange-like base 18 encircling the bottom of the structure and defining an opening at their tops. In the present embodiment, the cover is rectangular in plan, and the walls thereof taper inwardly toward their top opening, said opening being generally similar in size and shape to the top openings of the pans 7. Preferably, though not necessarily, the cover base 18 is large enough to engage around the pan rim 13 of an underlying pan whereby the cover is supported independently of the pan; in this manner, no special base structure is required for the covers, as would be the case if they were to fit and be retained on the rims 13.

Since covers of the present class are primarily intended both to prevent a drying out of the food in the pans which they cover and to minimize the possible contact of dust and germs with the food, it is desirable that the food be kept covered thereby to a maximum extent, and particularly in cafeterias, delicatessen stores, and the like, where large numbers of people pass and inspect the food. Accordingly, a transparent closure means is provided for the top opening of each cover, a pair of panes 19 of glass or the like being here shown provided for this opening which under these circumstances constitutes a sight opening. The panes 19 are arranged for displacement from their closure positions in the top cover opening for permitting access to the contents of the underlying pan, whereby the removal of the cover structure from over the pan is not necessary. The latter feature of the present invention is an important one, for the removal and replacement of the covers would consume an undue amount of time and effort, and space for temporarily putting down removed covers is usually not available adjacent a steam table. With the present arrangement, the covers themselves constantly function to support the panes 19, so that no extra table space is needed and a minimum of movement of the panes is involved.

For mounting the panes on the covers, the side walls 16 are provided adjacent and along their top edges with mutually opposed slot-like guideways 21 in and between which the panes 19 are arranged to slidably engage for movement longitudinally of the cover. When the panes are operatively disposed for closing the top of the cover, they are arranged to abut at a line centrally of the cover, as is shown in Figures 3 and 4. The end walls 17 preferably terminate at edges 22 thereof in the plane of the lower faces of the panes and the panes extend thereover and from the cover when in closure position. In this manner, the panes and cover walls are arranged to closely fit at their points of mutual abutment and a substantially air-tight structure results. The extension of the panes is seen to provide a means to facilitate their manipulation.

It will now be noted that when a pane 19 is displaced to substantially and fully expose the cover opening thereat, so little of the pane would engage the guideways 21 that, if the pane protruded from the cover with its outer end free, the weight thereof would produce such a cantilever strain on the portion engaged in the guideways that fracture of the pane might result. Accordingly, it is preferred that the outer pane ends be supported when extended from the cover to such an extreme degree, and, to avoid the provision of special supports, the rail and adjacent covers are arranged to be used for the purpose. The tops of the adjacent covers are, of course, higher than the plane of the panes, and the panes must therefore be disposable to slope upwardly from their inner ends. For effecting this disposal of the panes, the guideways 21 are preferably made wider in a vertical direction adjacent their extremities, as is particularly brought out in Figures 4 and 5. As shown, the rail 14 extends to substantially the same height as the covers whereby it provides for the support of a pane of a cover at an end of the steam table. In this manner, an additional support is provided for all of the panes if and when such is needed.

In serving from a plurality of the pans 7, it is usually desirable that one and the same serving tool (spoon, fork, etc.) be used for each pan and that at least the food engaging portion of the tool be protected from dust when the tool is not in use. Means are accordingly provided whereby a suitable serving tool may be associated with each pan to have its food engaging portion within the space of the pan and cover and its handle disposed for ready grasping when the cover is opened by the displacement of one or both of the panes 19. As particularly shown, such means comprises the provision of a notch 23 extending downwardly from the top edge of a side wall 16 through and to a point below the guideway whereby an opening is left below the plane of the panes 19 for the protrusion of the intermediate shank portion of the appropriate tool. Preferably, and as shown, the wall portion at the lower part of the notch 23 is formed as a substantially semi-conical lip 24 extending outwardly from the wall; in this manner, the actual depth of the cut for the notch is minimized. As particularly shown in Figure 1, the tool provided for one pan is a fork 25, while Figures 1, 2, 3 and 5 disclose a spoon 26 as the tool provided for another pan.

The notch 23, it will now be noted, is preferably provided centrally opposite the line of abutment of the panes 19 of a pair and is of such width longitudinally of the cover that the tool shank may be removed therefrom if only one of the panes is displaced. In this manner, the tool is arranged to be mounted for convenient accessibility in fixed association with its pan to have its food engaging portion enclosed with the food and its handle portion protruding. The sanitary value of such an arrangement is of course obvious, it being noted that the opening provided by the notch below the panes and around the tool shank is negligible as a means for admitting dust or other contaminating material within the cover.

In the embodiment disclosed in Figures 6 and 7, it is seen that a cover 31 is provided having upper and lower guideways 32 and 33 along opposite sides 34 thereof, the guideways 32 being cooperative to slidably support a pane 35, while the guideways 33 similarly support a pane 36. One end wall 38 preferably extends to the bottom plane of the pane 36 while the other end wall 39 extends only to the bottom plane of the pane 35. In this manner, a sealed closure of the cover by means of the panes is provided for in the same manner as before. The major advantage of this embodiment lies in the fact that when only a half opening of the cover is desired, the two panes may be disposed in superimposed relation and so not protrude from the cover. The panes may, of course, be disposed and supported outwardly of the cover in generally the same manner as are the panes 19 of the first described embodiment.

While the cover and pan structures herein disclosed are rectangular in plan, it will be obvious that they might be circular or oblong or of some other shape, and still provide the necessary guideways for the sliding panes. A limitation to the exact shape shown is therefore not intended, as such is not essential to an operative combination of the present invention. Furthermore, the transparency of the panes, while generally preferable, might, under some circumstances be unnecessary. Except for the panes, the cover structures would preferably be formed of aluminum.

From the foregoing description taken in connection with the accompanying drawings, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative, and that such changes may be made, when desired, as fall within the scope of the appended claims.

Having thus described my invention, I claim as new and desire to secure by Letters Patent of the United States the following:

1. In combination, a food steam-table having a top provided with openings for the mounted reception of a plurality of serving pans, serving pans supportedly mounted in said openings to extend downwardly therefrom, and covers for said pans disposable over the open sides of the pans for support solely by said table top and each comprising side walls cooperative to define a top opening, a transparent pane displaceably mounted on said walls and providing a closure for said opening, means guiding said pane for a lateral displacement thereof to uncover said opening, and means permitting the supported engagement of the outer end of a displaced pane on the cover of an adjacent pan.

2. In combination, a food steam-table having a top provided with openings for the mounted reception of a plurality of serving pans, serving pans supportedly mounted in said openings to extend downwardly therefrom, and covers for said pans disposable over the open sides of the pans for supported engagement directly on said steam table top and each comprising side walls cooperative to define a top opening for the cover, a transparent pane displaceably mounted on said walls and providing a closure for said cover opening, means guiding said pane for a rectilinear displacement thereof in its plane to uncover said cover opening and to extend from the cover, and means permitting the displacement of the outer end of an extending pane out of said plane of movement thereof for supportably disposing said end on an object independently supported on the steam table adjacent the cover and at a point of the object out of said plane.

In testimony whereof, I affix my signature.
BERTHA H. LARSON.